Oct. 7, 1930.   E. NIBBS ET AL   1,777,325
PISTON RING AND PISTON CONSTRUCTION
Filed March 19, 1928
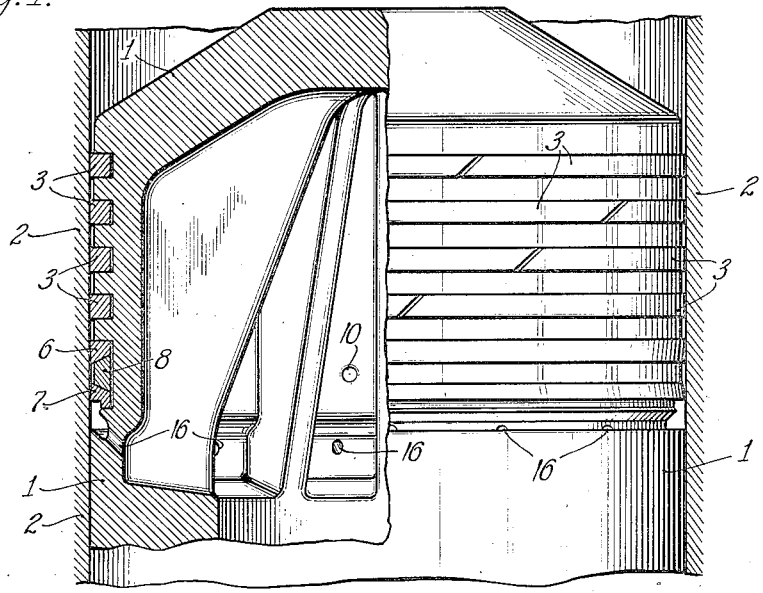
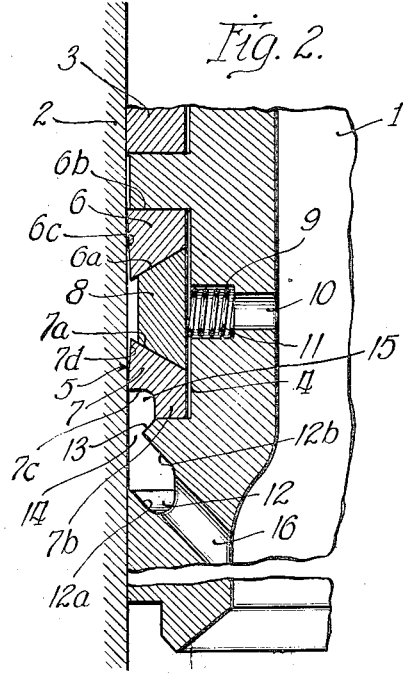
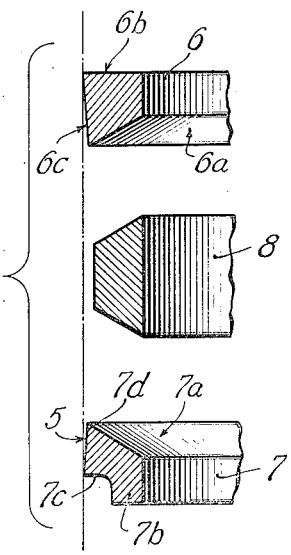
Inventors.
Ernest Nibbs.
and Frank T. Cable
By Brown, Jackson, Boettcher & Dienner
Attys.

Patented Oct. 7, 1930

1,777,325

UNITED STATES PATENT OFFICE

ERNEST NIBBS AND FRANK TAYLOR CABLE, OF NEW LONDON, CONNECTICUT, ASSIGN-
ORS TO ELECTRIC BOAT COMPANY, OF GROTON, CONNECTICUT, A CORPORATION OF
NEW JERSEY

PISTON RING AND PISTON CONSTRUCTION

Application filed March 19, 1928. Serial No. 262,656.

This invention relates to internal combustion engines, and more particularly to the construction of the piston and the lower or oil wiper piston ring.

In internal combustion engines serious difficulty and interference with the efficiency of the operation of the engine is frequently encountered due to pumping of oil by the piston, as is common knowledge in the art. This pumping is due, in large measure, to improper contact between the oil wiper ring and the cylinder wall resulting in leakage of oil past this ring. It is also due in part, to the lack of proper provision for quickly draining back into the crank case, the oil wiped off of the cylinder wall by the wiper ring. We have also found that the lack of means for draining oil from the wiper ring construction itself is a contributory cause to pumping. We have found that pumping can be prevented by providing suitable means for draining off the oil removed from the cylinder wall by the wiper ring and the oil which would otherwise collect in the wiper ring structure and the groove therefor, and by so constructing the wiper ring as to initially provide an effective closure between the same and the cylinder wall we insure that the ring will be quickly worn in so that its entire outer face will have a perfect working fit with the cylinder wall providing a permanent and effective closure which prevents oil leakage past the ring. We also provide the piston with means below and adjacent the wiper ring for quickly draining off the oil removed from the cylinder wall by this ring during the down stroke of the piston, the ring having means cooperating with this drainage means for directing the oil into the same. A further object of my invention is to provide a piston and an oil wiper ring of comparatively simple and inexpensive construction and which cooperate in the manner stated. Further objects and advantages will appear from the detail description.

In the drawings:—

Fig. 1 is an elevation, partly broken away and in section, of a piston and an oil wiper ring therefor constructed in accordance with our invention, as applied to a cylinder, the cylinder being shown fragmentarily and in section;

Fig. 2 is a fragmentary sectional view through the piston and the wiper ring on an enlarged scale, the cylinder wall being shown fragmentarily and in section; and Fig. 3 is a sectional view through the wiper ring the elements thereof being shown in disassembled or separated relation.

Our invention is applied to a piston 1 which, in its broader aspects, is of known construction and operates in a cylinder 2. This piston is provided with a plurality of grooves in which are mounted rings 3 of known type which contact with the cylinder wall to prevent gas leakage about the piston. The construction of the cylinder and the piston and the rings thereof so far described is well known in the art and need not be further considered in detail.

The piston 1 is provided with a lower ring groove 4 which is of much greater width or vertical height than the grooves of the rings 3. This groove 4 receives the oil wiper ring indicated in its entirety by 5. This wiper ring includes an upper ring member 6, a lower ring member 7, and a central wedge ring 8. The lower face $6^a$ of the upper member 6 is inclined upwardly and inwardly of the piston 1 so that this member tapers inwardly of groove 4. The upper face $6^b$ of member 6 is horizontal and seats against the top wall of groove 4. The upper face $7^a$ of ring member 7 is inclined downwardly and inwardly of the piston and the lower face of this member is horizontal and seats upon the lower wall of groove 4. The upper and lower faces of wedge ring 8 contact with the faces $6^a$ and $7^a$, respectively, of the ring members 6 and 7, this wedge ring tapering outwardly of the piston. The wedge ring 8 is urged outwardly radially so as to spread the ring members 6 and 7 apart and hold them against the top and bottom walls of the ring groove 4, the wedge ring also exerting outward radial pressure on the ring members so as to hold them tightly against the cylinder wall. This outward radial pressure of the wedge ring may be accomplished by the inherent resiliency of the ring itself, in which case this ring would be formed of a metal possessing the required strength and resiliency for this purpose, such as spring steel, or supplemental means may be provided for exerting outward radial pressure on the ring 8.

In the construction illustrated, the ring members 6 and 7 and the wedge ring 8 are preferably formed of cast iron. The piston 1 is provided with a plurality of radially disposed cylindrical recesses 9 extending from the back of groove 4, and with drainage outlet openings 10 of reduced bore extending from the inner ends of the recesses 9 and opening into the interior of the piston 1. Spiral springs 11 are seated in the recesses 9 and are confined between the inner ends of these recesses and the wedge ring 8 under compression, these springs acting by their expansive force to exert outward pressure on the wedge ring for holding the ring members 6 and 7 in close contact with the cylinder wall and with the upper and lower walls of the groove 4. The recesses 9, in addition to providing housing for the springs 11, form with the reduced passages 10 means for draining to the interior of the piston 1 any oil which may collect in the wiper ring structure and in the back space between this structure and the back of groove 4. This is of material assistance in preventing the collection of oil in the ring structure and the groove and eliminating any tendency to pumping which would result from this cause.

The lower portion $7^b$ of ring member 7 is reduced in radial thickness so that the upper portion of this member projects an appreciable distance outwardly beyond the lower portion radially thereof to form a shoulder $7^c$. The piston is provided in its outer face with a circumferential groove 12 of approximately U-shape in cross section, the lower wall $12^a$ and the upper wall $12^b$ of this groove being inclined downwardly and inwardly of the piston. The piston is cut away to an appreciable depth adjacent the upper edge of the upper wall $12^b$ of groove 12 so that this wall is connected to the lower wall of ring groove 4 by a shoulder 13 which is inclined downwardly and outwardly of the piston, the upper edge of wall $12^b$ being spaced an appreciable distance inwardly of the upper edge of wall $12^a$ so as to leave an opening or space 14 of appreciable width between the upper edge of the upper wall of the oil groove 12 and the wall of the cylinder 2. By reducing the lower portion $7^b$ of ring member 7 in thickness radially the outwardly projecting shoulder $7^c$ of this member forms with the outer face of portion $7^b$ and shoulder 13, and the cylinder wall, a substantially rectangular oil receiving space 15 extending completely about the piston and having communication with the oil receiving groove or channel 12 through the space or passage 14. The piston is provided with a plurality of oil drainage passages or outlets 16 suitably spaced about the piston and extending from the lower portion of the oil receiving groove 12, these passages opening at their lower ends into the interior of the piston 1. In the operation of the engine, during the down stroke of the piston the oil is scraped off of the cylinder wall by the shoulder $7^c$ of the lower ring member 7. This oil is caused to flow through the space or passage 14, which is its only means of escape from the space 15, and is ejected into the oil groove 12 from which it flows through the drainage passages 16 into the interior of piston 1 and is thus returned to the crank case. During the upstroke of the piston any oil remaining in the space 15 will flow down the inclined shoulder 13 and through the passage 14 into the groove 12 from which it will drip through the drainage passages 16.

Referring more particularly to Figs. 2 and 3, it will be noted that the outer face $6^c$ of the upper ring member 6 is disposed at a decided inclination to the cylinder wall downwardly and inwardly thereof so that this member has edge contact with the cylinder wall at its upper edge, that is, at its edge remote from its inclined or beveled lower face $6^a$. The outer face $7^d$ of the lower ring member 7 is disposed at a decided inclination to the cylinder wall upwardly and inwardly thereof so that this member has edge contact with the cylinder wall in the plane of shoulder $7^c$, that is, at the edge thereof remote from its inclined or beveled upper face $7^a$. As a result of this inclination of the faces of the ring members 6 and 7, the area of contact between each of these members and the cylinder wall is initially very small. As a result, these members wear very quickly at first which is desirable as quickly providing a perfect working fit between the cylinder wall and the members of the wiper ring for a portion thereof, this working fit being accomplished after the engine has been in operation but a short length of time. This is very desirable as preventing any appreciable initial leakage of oil beyond the wiper ring when the engine is first put into operation. As is known, from a practical standpoint it is a mechanical impossibility to obtain a perfect working fit between the ring and the cylinder wall in any other manner except that of relative reciprocation between these parts in contact with each other such as takes place in the actual operation of the engine. This being the case, it is a decided practical advantage to have the ring members wear as rapidly as possible, consistent with proper construction and the use of proper material, until the faces of these rings have obtained a perfect working fit with the cylinder wall. We accomplish this result by disposing the ring members 6 and 7 at an inclination to the cylinder wall in the manner illustrated and described so that the initial wear of these members is very rapid due to the small area of contact thereof with the cylinder wall. During continued operation of the engine the area of contact between the faces of the members 6 and 7 and the cylinder wall increases in accordance with wear of the ring members and the wear of these members correspondingly decreases until the entire outer faces of members 6 and 7 have been worn into working fit with the cylinder wall and are in contact therewith, after which wear of the ring members takes place very slowly and at approximately the same rate as that of rings which are initially installed with the entire outer faces thereof in contact with the cylinder wall in accordance with present practice. When the piston rings are installed in accordance with present practice so that the full face of the ring bears on the cylinder wall it is necessary that the engine be in continuous operation for a period of at least several months before a perfect working fit or bearing is obtained between the rings and the piston. During this period of wearing-in the rings there is considerable leakage of oil by the oil wiper rings and consequent pumping of oil which is, of course, objectionable. By our construction we overcome this delay in wearing-in of the ring members, and we effect a tight closure between the ring and the piston and the cylinder wall which effectually eliminates any oil leakage and pumping.

What we claim is:—

1. In combination, a cylinder, a piston operating in the cylinder and having a ring groove, upper and lower ring members mounted in the groove, and a wedge ring in the groove between said members and urged radially outward, the contacting faces of the wedge ring and said ring members being oppositely inclined, and the outer faces of the ring members being inclined to the cylinder wall and in edge contact therewith.

2. In combination, a cylinder, a piston operating in the cylinder and having a ring groove, upper and lower ring members mounted in the groove, the lower face of the upper member being inclined upwardly and inwardly of the piston and the upper face of the lower member being inclined downwardly and inwardly of the piston, and an outwardly tapering wedge ring mounted in the groove between said members and in contact with the inclined faces thereof, said ring being urged radially outward and the ring members projecting outwardly beyond the wedge ring, the outer face of the upper ring member being inclined downwardly and inwardly of the cylinder wall and in edge contact therewith and the outer face of the lower ring member being inclined upwardly and inwardly of the cylinder wall and in edge contact therewith.

3. In combination, a cylinder, a piston operating in the cylinder and having a ring groove, upper and lower ring members mounted in the groove, a wedge ring mounted in the groove between the ring members and having wedging contact therewith, said piston having recesses at the back of the ring groove, and springs mounted in said recesses and exerting outward pressure on the wedge ring radially thereof, the piston having drainage outlets extending from said recesses.

4. In combination, a cylinder, a piston operating in the cylinder and having a ring groove, upper and lower ring members mounted in the groove, a wedge ring mounted in the groove between the ring members and having wedging contact therewith, said piston having recesses extending radially thereof from the back of the ring groove and drainage outlets extending from said recesses and opening into the interior of the piston, and spiral springs seating in said recesses and exerting outward pressure on the wedge ring radially thereof.

In witness whereof we hereunto subscribe our names this 13 day of March, 1928.

ERNEST NIBBS.
FRANK TAYLOR CABLE.